United States Patent [19]

Gibbs

[11] Patent Number: 5,011,245

[45] Date of Patent: Apr. 30, 1991

[54] RADIATION SCANNING APPARATUS

[75] Inventor: Ronald Gibbs, Bedfordshire, United Kingdom

[73] Assignee: Crosfield Electronics Limited, London, England

[21] Appl. No.: 382,931

[22] Filed: Jul. 21, 1989

[30] Foreign Application Priority Data

Aug. 5, 1988 [GB] United Kingdom ............... 8818661

[51] Int. Cl.⁵ ............................................ G02B 26/10
[52] U.S. Cl. ..................................... 350/6.5; 350/6.4; 358/493
[58] Field of Search .................... 350/6.1, 6.2, 6.3, 6.4, 350/6.5, 6.6, 6.9, 6.91, 169, 170, 172, 173, 6-7; 250/234, 235, 236; 358/493

[56] References Cited

U.S. PATENT DOCUMENTS

| | | | |
|---|---|---|---|
| 3,531,162 | 10/1970 | Hannappel et al. | 350/6.7 |
| 4,525,749 | 6/1985 | Maeda et al. | 358/493 |
| 4,725,893 | 2/1988 | Granger | 358/493 |
| 4,750,045 | 6/1988 | Ohara et al. | 358/493 |

FOREIGN PATENT DOCUMENTS

| | | | |
|---|---|---|---|
| 735197 | 11/1932 | France | 350/6.1 |
| 53006833 | 10/1979 | Japan . | |
| 1482668 | 8/1977 | United Kingdom . | |
| 2151066 | 7/1985 | United Kingdom . | |

Primary Examiner—Bruce Y. Arnold
Assistant Examiner—Loha Ben
Attorney, Agent, or Firm—Sughrue, Mion, Zinn, Macpeak & Seas

[57] ABSTRACT

Radiation scanning apparatus comprises a record medium support (10); and a rotatably mounted scanning device (1) on which a modulated radiation beam (6) is incident in use. The device splits the incident beam into at least two subsidiary beams (17,21) which scan in turn across a record medium on the support during relative rotation between the scanning device and the support, each subsidiary beam exposing a respective scan line on the record medium in accordance with the beam modulation. The support (10) and device (1) are relatively movable such that the scan lines are offset in the direction of relative movement.

5 Claims, 3 Drawing Sheets

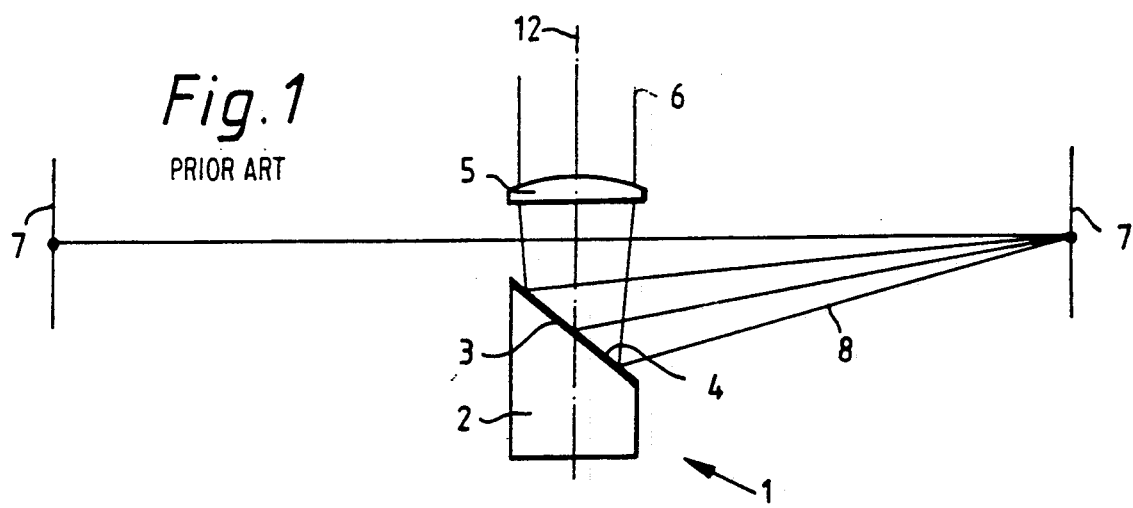
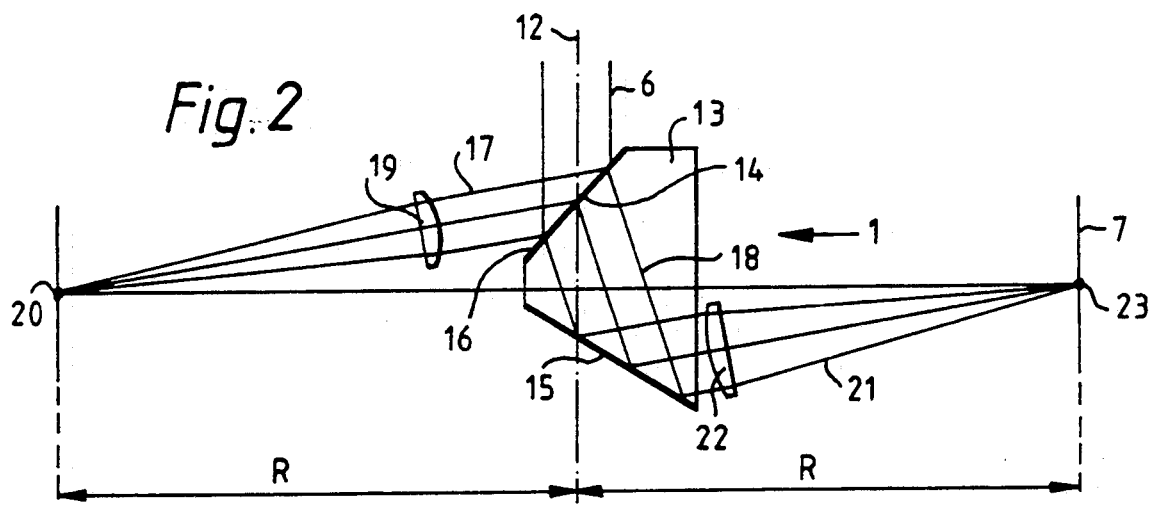
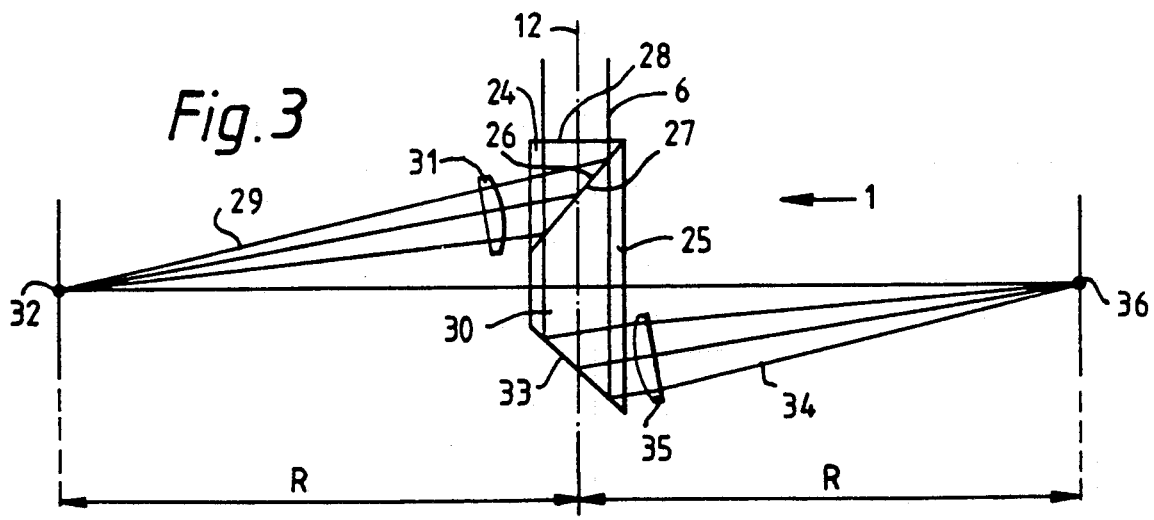

RADIATION SCANNING APPARATUS

FIELD OF THE INVENTION

This invention relates to radiation scanning apparatus and in particular radiation scanning apparatus having a scanning device which directs a beam of radiation onto a record medium by rotation of the scanning device.

DESCRIPTION OF THE PRIOR ART

In an internal drum scanner a scanning device is rotated inside the drum and a modulated beam of radiation is reflected by the scanning device and focussed on the record medium. The modulated beam may be produced by a source, not shown, which generates an unmodulated beam which thereafter is fed to a modulator, also not shown. Alternatively, the modulated beam may be produced by a source in modulated form by controlling the source itself suitably. The scanning device also moves linearly relative to the drum on a support which is movable along a fixed track which is also within the drum. Therefore, because of the support and the fixed track, it is impossible to record data on a record medium covering all 360° of the inside of the drum, as the beam is obscured by the track and support during part of the rotation cycle. In prior art arrangements, a record medium is located on one hemi-cylindrical surface of the drum and the scanning device within the drum is rotated. The disadvantage of this type of scanning system is that, as the record medium is located on only half of the drum, surface information can only be written onto the record medium for less than 180° of the rotation cycle of the scanning device. This leads to a significant "dead time" when no recording action is taking place.

SUMMARY OF THE INVENTION

In accordance with the present invention radiation scanning apparatus comprises a record medium support; and a rotatably mounted scanning device on which a modulated radiation beam is incident in use, wherein the device splits the incident beam into at least two subsidiary beams which scan in turn across a record medium on the support during relative rotation between the scanning device and the support, each subsidiary beam exposing a respective scan line on the record medium in accordance with the beam modulation, and wherein the support and device are relatively movable such that the scan lines are offset in the direction of relative movement.

By providing more than one output beam from the scanning device we have enabled the drum scanning system to record data on the record medium for greater than 180° of the rotation of the optical device.

Preferably, the record medium support is fixed and the scanning device rotates and moves to offset the scan lines, although it would be possible for the support to move relative to the scanning device to achieve the scan line offset.

In the preferred embodiment the incident radiation beam is split into two subsidiary beams which are diametrically opposite each other.

Typically, the scanning device comprises a reflector for each subsidiary beam and in the preferred embodiment the means to split the incident radiation beam is combined with one of the reflectors.

The scanning device may comprise a single glass substrate having a semi-reflective surface which acts to split the incident radiation beam into two subsidiary beams comprising a first output beam and a transmitted beam. The transmitted beam then undergoes total internal reflection at a second surface of the glass substrate to form a second output beam.

However, in the preferred embodiment, the optical device comprises two sections of glass substrate cemented together to form an interface which splits the incident radiation beam into two subsidiary beams comprising a first output beam and a transmitted beam. The transmitted beam then undergoes total internal reflection at a second surface of one of the substrate sections to form a second output beam.

Typically, the scanning apparatus also comprises means to focus each subsidiary beam and in the preferred embodiment the focussing means comprises a focussing lens for each subsidiary beam.

BRIEF DESCRIPTION OF THE DRAWINGS

Two examples of radiation scanning apparatus in accordance with the invention will now be described and contrasted with known radiation scanning apparatus with reference to the accompanying drawings, in which:

FIG. 1 is a diagram of a known scanning device;

FIG. 2 is a diagram showing a first embodiment of a scanning device according to the invention;

FIG. 3 is a diagram showing a second embodiment of a scanning device according to the invention;

DETAILED DESCRIPTION OF THE EMBODIMENTS

Figure 4:
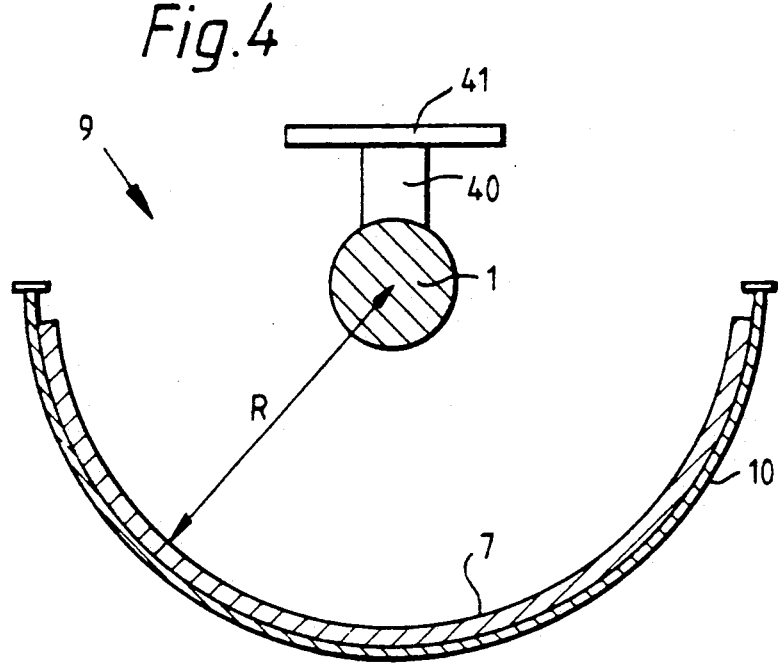
FIG. 4 is an end view of radiation scanning apparatus for use with the optical devices shown in FIGS. 1 to 3 and 6.

A conventional scanning device 1 for use in a beam scanning system is shown in FIG. 1. The scanning device 1 is mounted on a support 40 (see FIGS. 4 and 5) which is linearly movable along a track 41 (see FIGS. 4 and 5). The scanning device 1 comprises a glass substrate 2 which has a flat angled face 3 on which is deposited a reflective coating 4. A focusing lens 5 is mounted on the support 40 and is positioned so that a modulated input beam 6 passes through the lens 5 before striking the reflective coating 4 and being reflected as an output beam 8 onto the surface of a record medium 7. The lens 5 focuses the input beam 6 and hence the reflected output beam 8 to bring the reflected output beam 8 to a focus on the surface of the record medium 7.

Figure 5:
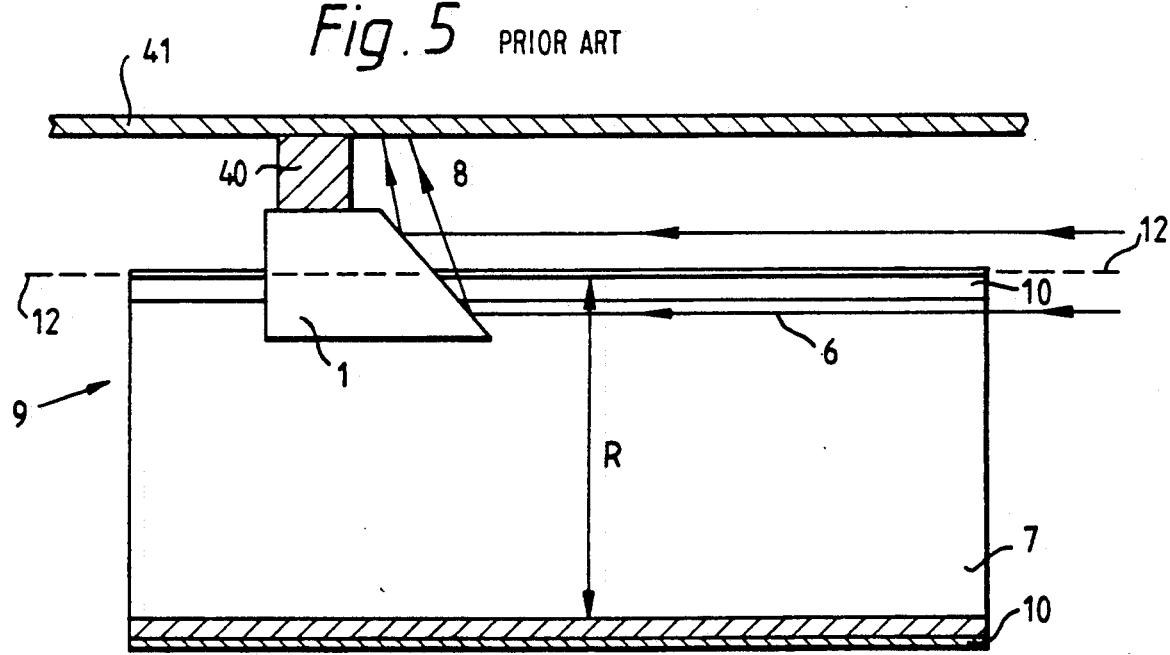
FIG. 5 is a cross-sectional view of radiation scanning apparatus using the scanning device shown in FIG. 1.

Referring now to FIGS. 4 and 5 it can be seen that the record medium 7 is located on the inside of a scanning drum 9 which comprises a record medium support 10. The record medium 7 is located on the inside surface of the support 10. The scanning device 1 is located coaxially with the scanning drum 9, by means of the support 40 and track 41 and rotates relative to the scanning drum 9 about an axis 12 (see FIGS. 1 and 5). This causes the reflected output beam 8 to scan circumferentially across the surface of the record medium 7. Each rotation of the device 1 causes one line of data to be recorded on the record medium 7 and after each rotation the support 40 moves linearly along the track 41, hence moving the scanning device 1 so that the next line of data can be recorded onto the record medium 7. Each line of data recorded may be separate from the other lines, or the lines of data may overlap each other.

Alternatively, the scanning device 1 may rotate and the drum 9 may move linearly to allow the next line of data to be recorded.

However, data, defined by the beam modulation, can only be recorded on the surface of the record medium 7 when the reflected output beam 8 is incident on its surface. Therefore, when the optical device 1 is orientated so that the reflected output beam 8 does not strike the record medium 7, as shown in FIG. 5, no data can be recorded on the record medium 7. Hence, for at least half of the rotation cycle of the scanning device 1 no data can be recorded on the record medium 7.

FIG. 2 shows one embodiment of the invention which overcomes this problem. In this embodiment the scanning device 1 comprises a glass substrate 13 which has two angled surfaces 14 and 15. On the angled surface 14 a semi-reflective coating 16 is deposited. The semi-reflective coating 16 acts as an optical beam splitter which divides the input beam 6 into a reflected output beam 17 and a transmitted beam 18. The reflected beam 17 is focused by a lens 19 mounted on the support 40, onto the surface of the record medium 7 at a point 20, a distance R from the axis 12 of the scanning device 1. The axis 12 is the central axis of the scanning drum 9 and the distance R is equal to the distance from the centre of the scanning drum 9 to the inside surface of the record medium 7, as shown in FIGS. 4 and 5.

The transmitted beam 18 is refracted at the surface 14 and as it enters the substrate 13, it then passes through the substrate to strike the surface 15 of the substrate 13 where it is reflected by total internal reflection and passes out of the substrate 13 as an output beam 21. The output beam 21 then passes through a lens 22 mounted on the support 40 which focuses the output beam 21 at the point 23, a distance R from the central axis 12 of the optical device 1.

The points 20, 23 lie diametrically opposite each other on the circumference of a circle, the centre of which is defined by the axis 12. As the optical device 1 rotates about the axis 12 the focus of the output beams 17, 21 remain on the circumference of that circle.

In operation, the scanning device 1 is positioned on the axis 12 of the scanning drum 9 so that the output beam 17 is focused onto the record medium 7 and traverses across the surface of the record medium 7 as the scanning device 1 is rotated about the axis 12. As the output beam 17 leaves the surface of the record medium 7, the scanning device 1 is moved along the axis 12 relative to the scanning drum 9 by means of the support 40 which is movable the on the track 41. The other output beam 21 then traverses onto the record medium 7 so that data may be recorded on the record medium 7 by the beam 21 while the output beam 17 is not incident on the record medium 7. Alternatively, the scanning device 1 may be moved continuously along the axis 12.

As the optical device 1 continues to rotate the output beam 21 will leave the record medium 7, and the scanning device 1 is again moved along the axis 12 relative to the scanning drum 9 so that as the output beam 17 traverses onto the record medium 7 the beam 17 exposes a new unexposed or partly unexposed scan line of the record medium 7.

This process of recording data on the record medium 7 and then shifting the scanning device 1 along the axis 12 as each of the output beams 17, 21 traverse off the record medium 7 continues until all the data is recorded on the record medium. Hence, the scanning device 1 is moved along the axis 12 after every 180° rotation of the scanning device 1.

In an alternative embodiment of the invention, shown in FIG. 3, the scanning device 1 comprises two glass substrate sections 24, 25, the sections having similar refractive indices. The substrate section 24 has a surface 26 which has a partially reflective coating deposited on it. The substrate section 25 has a surface 27 which is cemented to the surface 26. Hence, an input beam 6 which enters the device 1 through a surface 28 in the substrate section 24 is partially reflected from the coating on the surface 26 to generate an output beam 29 and a transmitted beam 30. The output beam 29 is focused by a lens 31 at a point 32 at the distance R from the axis 12. The transmitted beam 30 passes through the substrate section 25 and impinges on the surface 33 of the substrate section 25 where it undergoes total internal reflection, or is reflected by a fully reflective coating deposited on the surface 33, to generate an output beam 34. The output beam 34 is focused by a lens 35 at a point 36 which is also at the distance R from the axis 12. As in the embodiment shown in FIG. 2 the distance R is equal to the distance from the axis 12 of the scanning drum 9 to the internal surface of the record medium 7 shown on FIG. 4.

In operation the scanning device 1 shown in FIG. 3 operates in the same manner as the scanning device 1 shown in FIG. 2. The advantage of the scanning device 1 in FIG. 3 is that the bulk of the device is reduced and it rotates about a symmetrical axis, unlike the optical device in FIG. 2.

Figure 6:
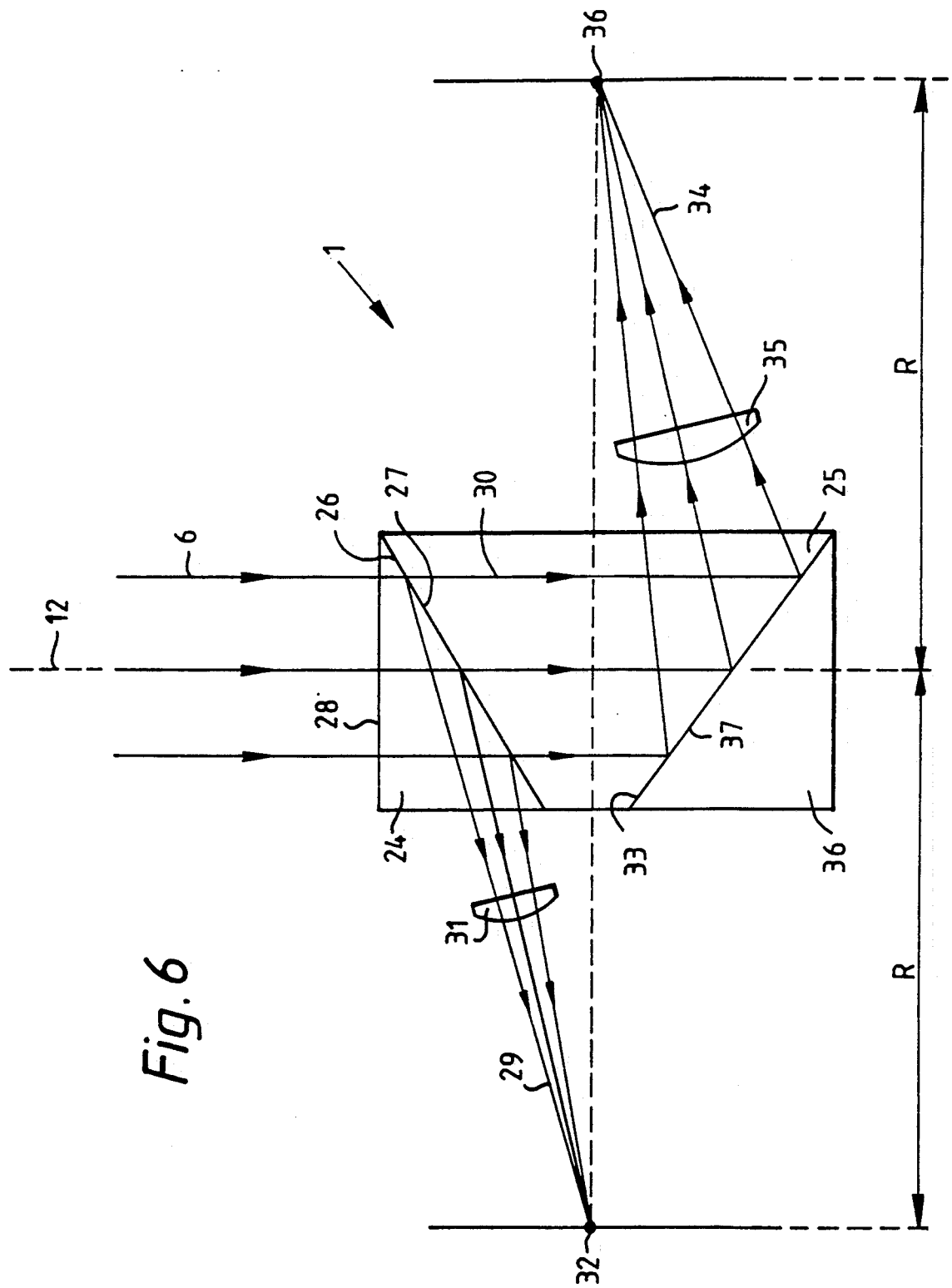
FIG. 6 is a diagram showing a third embodiment of a scanning device according to the invention.

In the embodiment shown in FIG. 6, the scanning device 1 is substantially identical to the scanning device 1 shown in FIG. 3, but has an additional substrate section 36 a surface 37 of which is cemented to the surface 33 of the substrate section 25. This scanning device 1 operates in an identical manner to the scanning device shown in FIG. 3, but the additional substrate section 36 gives the device better symmetry and hence, better dynamic balance when rotating.

In the embodiments shown in FIGS. 2, 3 and 6 the focusing lenses 19, 21, 31, 35 rotate with the scanning device 1.

The main advantage of the embodiments shown in FIGS. 2, 3 and 6 is that they enable twice the amount of data to be written for every rotation of the scanning device 1 than could be previously written by the prior art scanning device 1 shown in FIG. 1.

I claim:

1. Radiation scanning apparatus comprising a record medium support; and a rotatably mounted scanning device on which a modulated radiation beam is incident, wherein device splits said incident beam into at least first and second subsidiary beams which scan in turn across a record medium on said support during relative rotation between said scanning device and said support, each said subsidiary beam exposing a respective scan line on said record medium in accordance with the beam modulation, and wherein the support and said device are relatively movable such that the scan lines are offset in the direction of relative movement.

2. Apparatus according to claim 1, wherein said scanning device splits said incident beam into two diametrically opposite subsidiary beams.

3. Apparatus according to claim 1, wherein said scanning device comprises a partial reflector which causes part of said modulated radiation beam to be reflected so as to constitute said first subsidiary beam, and another reflector onto which radiation which has passed through said partial reflector impinges and is reflected so as to constitute second subsidiary beam (21).

4. Apparatus according to claim 3, wherein said device comprises a transparent substrate having a semi-reflective surface which forms said partial reflector and another reflective surface which forms said another reflector.

5. Apparatus according to claim 1, further comprising focusing means (31,35) for focusing each subsidiary beam (17,21).

* * * * *